US012109832B2

(12) United States Patent
Suzuki et al.

(10) Patent No.: US 12,109,832 B2
(45) Date of Patent: Oct. 8, 2024

(54) FILM FOR LATEX INK

(71) Applicant: LINTEC CORPORATION, Tokyo (JP)

(72) Inventors: Nana Suzuki, Toda (JP); Ritsuko Tsukada, Yokohama (JP)

(73) Assignee: LINTEC Corporation, Tokyo (JP)

( * ) Notice: Subject to any disclaimer, the term of this patent is extended or adjusted under 35 U.S.C. 154(b) by 137 days.

(21) Appl. No.: 18/016,483

(22) PCT Filed: Jul. 20, 2020

(86) PCT No.: PCT/JP2020/028141
§ 371 (c)(1),
(2) Date: Jan. 17, 2023

(87) PCT Pub. No.: WO2022/018807
PCT Pub. Date: Jan. 27, 2022

(65) Prior Publication Data

US 2023/0286310 A1 Sep. 14, 2023

(51) Int. Cl.
*B41M 5/52* (2006.01)

(52) U.S. Cl.
CPC ........ *B41M 5/5254* (2013.01); *B41M 5/5272* (2013.01)

(58) Field of Classification Search
CPC ......................... B41M 5/5254; B41M 5/5272; B41M 5/5227; B41M 5/52
See application file for complete search history.

(56) References Cited

U.S. PATENT DOCUMENTS

2019/0210391 A1* 7/2019 Saha .................... B41M 5/0017

FOREIGN PATENT DOCUMENTS

| | | | |
|---|---|---|---|
| JP | 2007514576 | A | 6/2007 |
| JP | 2007524507 | A | 8/2007 |
| JP | 2009202367 | A | 9/2009 |
| JP | 2012117180 | A | 6/2012 |
| JP | 2014501636 | A | 1/2014 |
| JP | 2016120719 | A | 7/2016 |
| JP | 2019172877 | A | 10/2019 |

OTHER PUBLICATIONS

International Search Report issued Oct. 6, 2020 in PCT/JP2020/028141 (with English translation), 5 pages.

* cited by examiner

*Primary Examiner* — Bradley W Thies
(74) *Attorney, Agent, or Firm* — Element IP, PLC

(57) ABSTRACT

An object is to provide a film for latex ink having a latex ink-receiving layer containing an acrylic resin, the latex ink-receiving layer having excellent adhesion to both a printed portion using latex ink and a base material. Then, the object is achieved by the following: a film for latex ink having a laminate structure in which a latex ink-receiving layer (X) and a base material (Y) are stacked, in which the latex ink-receiving layer (X) is formed of a resin composition (x1) containing an acrylic resin (A) having a cross-linkable functional group and a cross-linking agent (B), and the cross-linking agent (B) contains an isocyanurate compound (B1) and a modified product (B2) of the isocyanurate compound.

9 Claims, 1 Drawing Sheet

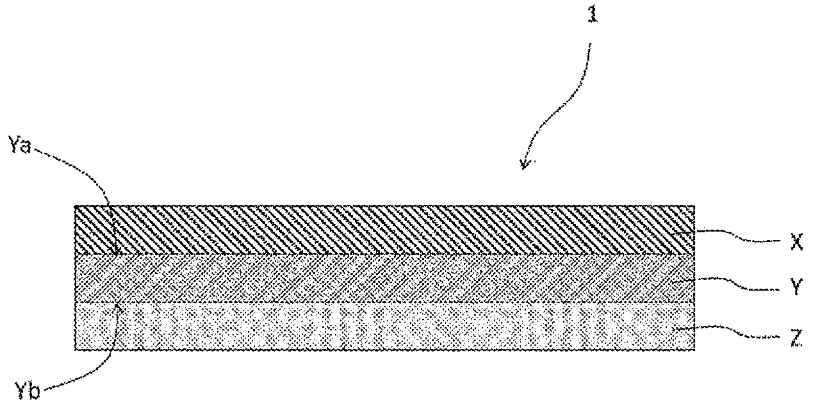
1
Ya
X
Y
Z
Yb

FILM FOR LATEX INK

TECHNICAL FIELD

The present invention relates to a film for latex ink.

BACKGROUND ART

In recent years, a printing method using latex ink is gathering attention (refer to, for example, Patent Literature 1).

The latex ink is an aqueous ink in which a pigment is dispersed in water together with a latex (polymer). This is different from a solvent ink in which the pigment is dissolved in an organic solvent. The solvent ink faces a problem of volatile organic substances (VOC) emission caused by organic solvents during use. The latex ink does not pose this problem. Therefore, a printed article using latex ink has an advantage that it can be used safely in various places such as restaurants, educational institutions, medical institutions, and commercial establishments.

Based on this advantage, the present applicant has proposed a film for latex ink in Patent Literature 2. The film for latex ink disclosed in Patent Literature 2 includes a base material and a printable coat layer to which latex ink is applied. The printable coat layer includes a material having a structure in which a polymeric material having constituent monomers including vinyl chloride, vinyl acetate, and a cross-linkable monomer is cross-linked by a cross-linking agent. Thus, the film for latex ink having a printable coat layer that has excellent adhesion to both a printed portion printed with the latex ink and a base material can be provided.

The "printable coat layer" in Patent Literature 2 is called "latex ink-receiving layer" in the present specification. That is, the "latex ink-receiving layer" refers to a site to which latex ink is applied, and it is a layer having a function of fixing the printed portion by the applied latex ink.

CITATION LIST

Patent Literature

Patent Literature 1: JP 2016-120719 A

Patent Literature 2: JP 2019-172877 A

SUMMARY OF INVENTION

Technical Problem

In recent years, the printing method using latex ink has been adopted in various areas, and such wide adoption has prompted diverse requirements for a film for latex ink used. Therefore, it is desired to develop a film for latex ink including a latex ink-receiving layer different from that of Patent Literature 2.

Thus, the present inventors have investigated a latex ink-receiving layer containing an acrylic resin that is a highly versatile resin. However, when the latex ink-receiving layer containing an acrylic resin is used, the present inventors discovered that adhesion between the latex ink-receiving layer and the printed portion printed with the latex ink, and adhesion between the latex ink-receiving layer and the base material are not easily achievable simultaneously, and that further investigation is required.

An object of the present invention is to provide a film for latex ink having a latex ink-receiving layer containing an acrylic resin, the latex ink-receiving layer having excellent adhesion to both a printed portion by a latex ink and a base material.

Solution to Problem

As a result of diligent research to solve the above-described problems, the present inventors have found that a latex ink-receiving layer formed of a resin composition in which a specific cross-linking agent is blended in an acrylic resin having a cross-linkable functional group has excellent adhesion to both a printed portion printed with latex ink and a base material. The present inventors have conducted a variety of research on the basis of such findings and have completed the present invention.

That is, the present invention relates to (1) to (9) below.

[1] A film for latex ink including a laminate structure in which a latex ink-receiving layer (X) and a base material (Y) are stacked, in which the latex ink-receiving layer (X) is formed of a resin composition (x1) containing an acrylic resin (A) having a cross-linkable functional group and a cross-linking agent (B), the cross-linking agent (B) contains an isocyanurate compound (B1) and a modified product (B2) of the isocyanurate compound, the isocyanurate compound (B1) is a trimer of 1,6-hexamethylene diisocyanate, and the modified product (B2) of the isocyanurate compound is a trimer of 1,6-hexamethylene diisocyanate, and has one or more tertiary amino group(s).

[2] The film for latex ink according to [1], in which the acrylic resin (A) having the cross-linkable functional group has a hydroxyl value of 5.0 mg KOH/g to 25.0 mg KOH/g.

[3] The film for latex ink according to [1] or [2], in which the acrylic resin (A) having the cross-linkable functional group has a glass transition temperature (Tg) of 100° C. or lower.

[4] The film for latex ink according to any one of [1] to [3], in which a total content of the isocyanurate compound (B1) and the modified product (B2) of the isocyanurate compound is 4.0 parts by mass or greater with respect to 100 parts by mass of the acrylic resin (A) having the cross-linkable functional group.

[5] The film for latex ink according to any one of [1] to [4], in which the base material (Y) contains a polyester resin.

[6] The film for latex ink according to any one of [1] to [5], in which the film is for use in printing using latex ink containing an acrylic resin.

[7] A method for using the film for latex ink described in any one of [1] to [6] to form a printed portion, using latex ink, on a latex ink-receiving layer of the film for latex ink.

[8] A method for producing a printed article, the method including forming a printed portion, using latex ink, on a latex ink-receiving layer of the film for latex ink described in any one of [1] to [6].

[9] A printed article including a printed portion printed with latex ink on a latex ink-receiving layer of the film for latex ink described in any one of [1] to [6].

Advantageous Effects of Invention

According to the present invention, it is possible to provide a film for latex ink having a latex ink-receiving layer containing an acrylic resin, in which the latex ink-receiving layer having excellent adhesion to a printed portion printed with latex ink and a base material.

BRIEF DESCRIPTION OF DRAWINGS

FIG. 1 is a schematic cross-sectional view illustrating one aspect of a film for latex ink of the present invention.

DESCRIPTION OF EMBODIMENTS

In the present specification, "active components" refer to components excluding a diluent solvent, such as water or an alcohol, from components contained in a target composition.

In addition, in the present specification, "(meth)acrylic acid" refers to both "acrylic acid" and "methacrylic acid", and the same is true of other similar terms.

Moreover, in the present specification, the lower and upper limits of a preferred numerical range (e.g., a range of content) described in series can each be independently combined. For example, from the description "preferably from 10 to 90, more preferably from 30 to 60", the "preferred lower limit (10)" and the "preferred upper limit (60)" can be combined as "from 10 to 60".

In addition, in the present specification, the numerical values of examples are numerical values that can be used as an upper limit value or a lower limit value.

Aspect of Film for Latex Ink of the Present Invention

The film for latex ink according to an aspect of the present invention has a laminate structure in which a latex ink-receiving layer (X) and a base material (Y) are stacked.

The latex ink-receiving layer (X) is formed of an acrylic resin (A) having a cross-linkable functional group and a resin composition (x1) containing a cross-linking agent (B).

The cross-linking agent (B) contains an isocyanurate compound (B1) and a modified product (B2) of the isocyanurate compound.

The isocyanurate compound (B1) is a trimer of 1,6-hexamethylene diisocyanate, and the modified product (B2) of the isocyanurate compound is a trimer of 1,6-hexamethylene diisocyanate, and has one or more tertiary amino group(s).

As a result of intensive studies, the present inventors have found that a latex ink-receiving layer formed of a resin composition (x1) containing an acrylic resin (A) having a cross-linkable functional group and a cross-linking agent (B) containing an isocyanurate compound (B1) and a modified product (B2) of the isocyanurate compound has excellent adhesion to both a printed portion printed with latex ink and a base material, and have further conducted various studies to complete the present invention.

Hereinafter, with respect to the film for latex ink according to an aspect of the present invention, a configuration of the film for latex ink, the members constituting the film for latex ink (base material, latex ink-receiving layer, pressure sensitive adhesive layer, and release liner), a method for producing a film for latex ink, and applications of the film for latex ink will be described in detail.

Configuration of Film for Latex Ink

The film for latex ink according to an aspect of the present invention has a laminate structure in which a latex ink-receiving layer (X) and a base material (Y) are stacked.

FIG. 1 illustrates a schematic cross-sectional view of one aspect of the film for latex ink of the present invention. A film 1 for latex ink illustrated in FIG. 1 has a laminate structure in which the latex ink-receiving layer (X) is stacked on one surface (Ya) of the base material (Y).

As illustrated in FIG. 1, the film for latex ink according to one aspect of the present invention is preferably provided with a pressure sensitive adhesive layer (Z) on the other surface (Yb) of the base material (Y). As a result, the film for latex ink can be suitably used as a pressure sensitive adhesion film.

Although not illustrated, the pressure sensitive adhesion surface of the pressure sensitive adhesive layer (Z) may be covered with a release liner. When the film is attached to the adherend, the release liner may be peeled off to expose the pressure sensitive adhesion surface of the pressure sensitive adhesive layer (Z).

Additionally, although not illustrated, a latex ink-receiving layer (X) may be provided on both of one surface (Ya) and the other surface (Yb) of the base material (Y), without the pressure sensitive adhesive layer (Z) being provided.

Member Constituting Film for Latex Ink

The film for latex ink according to one aspect of the present invention has the latex ink-receiving layer (X) and the base material (Y).

Furthermore, the film for latex ink of one aspect of the present invention may further include the pressure sensitive adhesive layer (Z) in addition to the latex ink-receiving layer (X) and the base material (Y) as described above. Additionally, it may further include the pressure sensitive adhesive layer (Z) and the release liner in addition to the latex ink-receiving layer (X) and the base material (Y).

The latex ink-receiving layer (X), the base material (Y), the pressure sensitive adhesive layer (Z), and the release liner are described in detail below.

Latex Ink-Receiving Layer (X)

The film for latex ink according to one aspect of the present invention includes the latex ink-receiving layer (X).

The latex ink-receiving layer (X) is a site to which latex ink is applied, and has a function of fixing the printed portion by the applied latex ink.

The thickness of the latex ink-receiving layer (X) is not particularly limited, and is preferably from 0.05 μm to 50 μm, more preferably from 0.1 to 25 μm, and still more preferably from 0.1 μm to 10 μm.

The latex ink-receiving layer (X) is formed of an acrylic resin (A) having a cross-linkable functional group and a resin composition (x1) containing a cross-linking agent (B).

The cross-linking agent (B) contains an isocyanurate compound (B1) and a modified product (B2) of the isocyanurate compound.

The isocyanurate compound (B1) is a trimer of 1,6-hexamethylene diisocyanate, and the modified product (B2) of the isocyanurate compound is a trimer of 1,6-hexamethylene diisocyanate, and has one or more tertiary amino group(s).

In the following description, the "acrylic resin (A) having a cross-linkable functional group" and the "cross-linking agent (B)" are also referred to as a "component (A)" and a "component (B)". In addition, the "isocyanurate compound (B1)" and the "modified product (B2) of the isocyanurate compound" are also referred to as a "component (B1)" and a "component (B2)", respectively.

In one aspect of the present invention, a resin composition (x1), which is a forming material of the latex ink-receiving layer (X), may be formed of only the component (A) and the component (B), and may contain other components other than the component (A) and the component (B) together with the component (A) and the component (B) as long as the effect of the present invention is not impaired. Examples of the other components include additives for an ink receiving layer generally used for an ink receiving layer such as the latex ink-receiving layer, for example, a reaction accelerator (catalyst), a surface conditioner, a plasticizer, an ultraviolet absorber, a light stabilizer, a filler, and a colorant.

In one aspect of the present invention, a total content of the component (A) and the component (B) is preferably 80 mass % to 100 mass %, more preferably 85 mass % to 100 mass %, still more preferably 90 mass % to 100 mass %, and even more preferably 95 mass % to 100 mass %, based on the total amount of the active components of the resin composition (x1).

Hereinafter, the acrylic resin (A) having a cross-linkable functional group and the cross-linking agent (B) contained in the resin composition (x1) will be described in detail.

Acrylic Resin (A) Having Cross-Linkable Functional Group

The resin composition (x1) used in the present invention contains an acrylic resin (A) having a cross-linkable functional group. It is assumed that the resin composition (x1) used in the present invention contains the acrylic resin (A) having a cross-linkable functional group, and the reaction with the cross-linking agent (B) described below forms the suitable cross-link structure that improves the adhesion to both a printed article printed with the latex ink and the base material, thereby exhibiting the effect of the present invention.

The acrylic resin (A) having a cross-linkable functional group is preferably an acrylic resin (A1) having a constituent unit (a1) derived from a cross-linkable functional group-containing monomer (a1') (hereinafter, also referred to as a monomer (a1')).

Examples of the cross-linkable functional group of the monomer (a1') include one or more selected from a hydroxyl group, a carboxy group, an amino group, and an epoxy group.

In other words, examples of the monomer (a1') include a hydroxyl group-containing monomer, a carboxy group-containing monomer, an amino group-containing monomer, and an epoxy group-containing monomer. In addition, a monomer containing two or more cross-linkable functional groups selected from a hydroxyl group, a carboxy group, an amino group, an epoxy group, and the like can also be exemplified.

These monomers (a1') may be used alone or in combination of two or more.

Among them, the monomer (a1') is preferably a hydroxyl group-containing monomer and a carboxy group-containing monomer.

Examples of the hydroxyl group-containing monomer include hydroxyalkyl (meth)acrylates, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth) acrylate; N-methylolated acrylamide; ε-caprolactone-modified hydroxy (meth)acrylate; and carbonate-modified (meth) acrylate.

Examples of the carboxy group-containing monomer include (meth)acrylic acid; a compound obtained by reacting a terminal hydroxyl group of the above-mentioned hydroxyl group-containing monomer with an acid anhydride such as one or more aliphatic dicarboxylic acid(s) selected from succinic anhydride, glutaric anhydride, and the like; and the like.

Here, the acrylic resin (A) having a cross-linkable functional group may be an acrylic copolymer (A2) having a constituent unit (a2) derived from an alkyl (meth)acrylate (a2') (hereinafter, referred to as "monomer (a2')") together with the cross-linkable functional group-containing monomer (a1').

The number of carbon atoms of the alkyl group of the monomer (a2') is preferably 1 to 24. The number of carbon atoms in the alkyl group is preferably 2 to 20 from the viewpoint of adjusting the glass transition temperature (Tg) of the acrylic resin (A) to an appropriate range to exhibit the effect of the present invention more easily.

In addition, the alkyl group contained in the monomer (a2') may be a linear alkyl group or a branched alkyl group.

Examples of the monomer (a2') include methyl (meth) acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth) acrylate, n-hexyl (meth)acrylate, 2-ethylhexyl (meth)acrylate, lauryl (meth)acrylate, tridecyl (meth)acrylate, and stearyl (meth)acrylate.

These monomers (a2') may be used alone or in combination of two or more.

In the acrylic copolymer (A2) containing the constituent unit (a2), a content of the constituent unit (a2) is preferably 1 to 99 mass %, more preferably 5 to 95 mass %, and still more preferably 10 to 90 mass %, based on the total amount of the acrylic copolymer (A2).

The acrylic resin (A1) and the acrylic copolymer (A2) may be an acrylic copolymer (A3) further having a constituent unit (a3) derived from a monomer (a3') other than the monomers (a1') and (a2').

Examples of the monomer (a3') include olefins, such as ethylene, propylene, and isobutylene; halogenated olefins, such as vinyl chloride and vinylidene chloride; diene-based monomers, such as butadiene, isoprene, and chloroprene; (meth)acrylates having a cyclic structure, such as cyclohexyl (meth)acrylate, benzyl (meth)acrylate, isobornyl (meth) acrylate, dicyclopentanyl (meth)acrylate, dicyclopentenyl (meth)acrylate, dicyclopentenyloxyethyl (meth)acrylate, and imide (meth)acrylate; styrene, α-methylstyrene, vinyl toluene, vinyl formate, vinyl acetate, acrylonitrile, (meth) acrylamide, (meth)acrylonitrile, (meth)acryloylmorpholine, and N-vinylpyrrolidone.

In the acrylic copolymer (A3) containing the constituent unit (a3), a content of the constituent unit (a3) is preferably 1 to 99 mass %, more preferably 5 to 95 mass %, and still more preferably 10 to 90 mass %, based on the total amount of the acrylic copolymer (A3).

A molecular weight of the acrylic resin (A) having a cross-linkable functional group is not particularly limited, and the number average molecular weight is preferably from 3000 to 100000.

Note that the number average molecular weight is a value calibrated with polystyrene, determined by gel permeation chromatography (GPC) measurement using differential refractometer detection.

A hydroxyl value of the acrylic resin (A) having a cross-linkable functional group is preferably 5.0 mg KOH/g to 25.0 mg KOH/g, more preferably 6.0 mg KOH/g to 24.0 mg KOH/g, and still more preferably 7.0 mg KOH/g to 23.0 mg KOH/g.

When the hydroxyl value of the acrylic resin (A) having a cross-linkable functional group is equal to or greater than the lower limit described above, the adhesion between the latex receiving layer and the latex ink printed portion formed on the latex receiving layer is easily improved. Also, the stability of the latex ink-receiving layer is easily improved.

When the hydroxyl value of the acrylic resin (A) having a cross-linkable functional group is equal to or less than the upper limit described above, the stability of the coating solution (solution containing the resin composition (x)) used in forming the latex ink-receiving layer (X) is easily improved. In addition, it is easy to suppress shrinkage curl due to curing shrinkage of the latex ink-receiving layer (X) caused by dense cross-linking.

Note that, in the present specification, the hydroxyl value of the acrylic resin (A) having a cross-linkable functional group means a value measured in accordance with JIS K 0070:1992.

An acid value of the acrylic resin (A) having a cross-linkable functional group is preferably 10.0 mg or less, more preferably 1.0 mg KOH/g to 9.0 mg KOH/g, and still more preferably 2.0 mg KOH/g to 8.0 mg KOH/g.

Note that, in this specification, the acid value of the acrylic resin (A) having a cross-linkable functional group means a value measured in accordance with JIS K 0070: 1992.

The glass transition temperature (Tg) of the acrylic resin (A) having a cross-linkable functional group is preferably 100° C. or lower, more preferably 95° C. or lower, and still more preferably 90° C. or lower from the viewpoint of improving the adhesion between the latex ink-receiving layer and the printed portion printed with the latex ink. In particular, when the glass transition temperature (Tg) of the acrylic resin (A) having a cross-linkable functional group is lower than the curing temperature of the latex ink, the adhesion between the latex ink-receiving layer and the printed portion printed with the latex ink is further easily improved.

In addition, the glass transition temperature (Tg) of the acrylic resin (A) having a cross-linkable functional group is typically 30° C. or higher, preferably 40° C. or higher, and more preferably 50° C. or higher from the viewpoint of improving blocking resistance.

In the present specification, the glass transition temperature (Tg) of the acrylic resin (A) having a cross-linkable functional group means a value measured using a differential scanning calorimeter (Product name "DSC Q2000" available from TA Instruments Japan Inc.) at a heating rate of 20° C./min in accordance with JIS K 7121:1987.

A content of the acrylic resin (A) having a cross-linkable functional group is not particularly limited, and is preferably from 85 mass % to 98 mass %, more preferably from 87 mass % to 97 mass %, and still more preferably from 88 mass % to 96 mass %, based on the total amount of the active components of the resin composition (x1), as long as the effect of the present invention is exhibited.

Cross-Linking Agent (B)

The resin composition (x1) used in the present invention contains the cross-linking agent (B).

The cross-linking agent (B) contains an isocyanurate compound (B1) and a modified product (B2) of the isocyanurate compound.

When the cross-linking agent (B) does not include the modified product (B2) of the isocyanurate compound and includes only the isocyanurate compound (B1), the adhesion between the latex ink-receiving layer and the base material (Y) cannot be secured. That is, it is presumed that by using the cross-linking agent (B) containing the isocyanurate compound (B1) and the modified product (B2) of the isocyanurate compound, when a coating of the resin composition (x1) is formed on the base material (Y), a latex ink-receiving layer having a cross-link structure excellent in the adhesion to the base material (Y), particularly adhesion to the base material (Y) containing a polyester resin such as polyethylene terephthalate, is formed due to the influence of a polar group of the modified product (B2) of the isocyanurate compound.

The cross-linking agent (B) may contain a cross-linking agent besides the isocyanurate compound (B1) and the modified product (B2) of the isocyanurate compound in a range that does not impair the effects of the present invention. From the viewpoint of further easily achieving the effect of the present invention, a total content of the isocyanurate compound (B1) and the modified product (B2) of the isocyanurate compound is preferably from 80 mass % to 100 mass %, more preferably from 90 mass % to 100 mass %, and still more preferably from 95 mass % to 100 mass %, based on the total amount of the cross-linking agent (B).

The isocyanurate compound (B1) and the modified product (B2) of the isocyanurate compound are described in detail below.

Isocyanurate Compound (B1)

The cross-linking agent (B) contains an isocyanurate compound (B1).

The isocyanurate compound (B1) is a trimer of 1,6-hexamethylene diisocyanate, and specifically is a compound of formula (1) below.

(1)

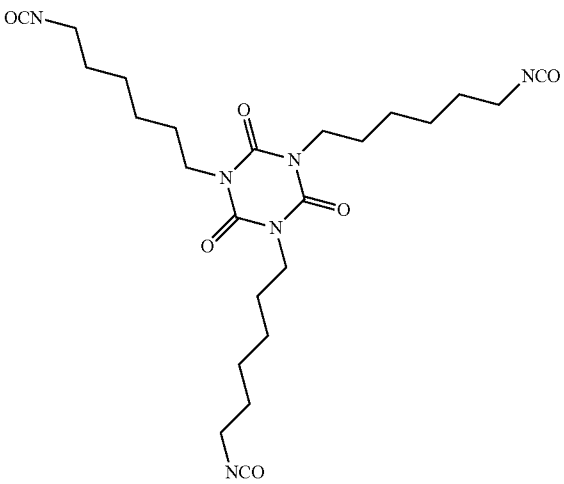

Modified Product (B2) of Isocyanurate Compound

The cross-linking agent (B) contains the modified product (B2) of the isocyanurate compound.

The modified product (B2) of the isocyanurate compound is a trimer of 1,6-hexamethylene diisocyanate, and has one or more tertiary amino group(s).

Examples of the method for introducing one or more tertiary amino group(s) into the compound of the formula (1) to form a modified product include a method for reacting a modifier with the compound of the formula (1), the modifier having a hydroxyl group and a tertiary amino group.

Examples of such a modifier include N,N-dimethylaminohexanol (for example, KAOLIZER NO. 25, available from Kao Corporation), N,N-dimethylaminoethoxyethoxyethanol (for example, KAOLIZER NO. 23NP, available from Kao Corporation), N,N-dimethylaminoethoxyethanol (for example, KAOLIZER NO. 26, available from Kao Corporation), N,N,N'-trimethylaminoethylethanolamine (for example, TOYOCAT RX5 available from Tosoh Corporation), 2-[[3-(dimethylamino)propyl]methylamino] ethanol (for example, POLYCAT 17 available from Evonik K.K.), and N,N-dimethylethanolamine (for example, JEFFCAT DMEA available from Huntsman Corporation).

The modifier may have a ring structure, and is preferably a compound having no ring structure as described above. Furthermore, the modifier is preferably an organic nonmetal compound as described above that does not have a metal element. That is, the modifier is preferably an acyclic organic nonmetal compound having a hydroxyl group and a tertiary amino group.

The reaction between the compound of the formula (1) and the modifier is preferably performed by adding a compound of the formula (1) and a modifier in a nitrogen-purged reaction vessel, under stirring at a reaction temperature of 60° C. to 100° C. for 1 hour to 5 hours.

(Preparation of Cross-Linking Agent (B) Containing Isocyanurate Compound (B1) and Modified Product of Isocyanurate Compound (B2))

The resin composition (x1) used in the present invention contains the cross-linking agent (B) containing the isocyanurate compound (B1) and the modified product (B2) of the isocyanurate compound.

For preparation of the cross-linking agent (B) containing the isocyanurate compound (B1) and the modified product (B2) of the isocyanurate compound, for example, a ratio of added amounts of the compound of the formula (1) and the modifier charged in a reaction vessel is adjusted when the compound of the formula (1) and the modifier are reacted.

Regarding the ratio of the added amounts of the modifier to the compound of the formula (1), the content of the modifier is preferably 0.01 to 10 parts by mass, and more preferably 0.05 parts by mass to 5 parts by mass, based on 100 parts by mass of the compound of the formula (1). In this manner, among the compounds of the formula (1), only a portion of the compounds of the formula (1) is converted to a compound having one or more tertiary amino group(s), and it is possible to prepare the cross-linking agent (B) containing the isocyanurate compound (B1) and the modified product (B2) of the isocyanurate compound.

Note that the content of the modified product (B2) of the isocyanurate compound is preferably 0.5 mol % to 10 mol %, more preferably 1 mol % to 5 mol %, with respect to the total amount of the isocyanurate compound (B1) and the modified product (B2) of the isocyanurate compound.

A total content of the isocyanurate compound (B1) and the modified product (B2) of the isocyanurate compound is preferably 4.0 parts by mass or greater, more preferably 4.4 parts by mass or greater, still more preferably 5.0 parts by mass or greater, even more preferably 6.0 parts by mass or greater, and even still more preferably 7.0 parts by mass or greater with respect to 100 parts by mass of the acrylic resin (A) having a cross-linkable functional group, from the viewpoint of further improving the adhesion between the latex ink-receiving layer (X) and the printed portion printed with the latex ink. Also, the content is preferably 14.0 parts by mass or less, and more preferably 13.0 parts by mass or less.

Base Material (Y)

The film for latex ink according to one aspect of the present invention includes the base material (Y).

The base material (Y) supports the latex ink-receiving layer (X) and has a function as a support supporting the printed portion formed on the latex ink-receiving layer (X).

The base material (Y) is not particularly limited, and is preferably a resin film. When the base material (Y) is a resin film, the film for latex ink can be improved in rigidity, flexibility, and the like, and the film for latex ink can be improved in handleability. This is also advantageous from the viewpoint of reducing the production cost and weight of the film for latex ink.

Here, the base material (Y) is preferably a resin film having transparency. When the base material (Y) is a resin film having transparency, the printed article in which the printed portion is formed on the latex ink-receiving layer of the film for latex ink can be suitably used for applications as glass decoration of stores, showrooms, offices, and the like.

Examples of the resin constituting the resin film include polyester resins such as polyethylene terephthalate, polybutylene terephthalate, and polyethylene naphthalate; polyolefin resins such as polyethylene and polypropylene; polystyrene; an acrylonitrile-butadiene-styrene copolymer; cellulose triacetate; polycarbonate; urethane resins such as polyurethane and acrylic-modified polyurethane; polymethylpentene; polysulfone; polyether ether ketone; polyethersulfone; polyphenylene sulfide; polyimide resins such as polyetherimide and polyimide; polyamide resins; acrylic resins; and fluorine resins.

Among these, polyester resins and polyolefin resins are preferable, polyester resins are more preferable, and polyethylene terephthalate is still more preferable from the viewpoint of improvement in adhesion with the latex ink-receiving layer.

The resin film may be formed of only one kind of resin, or may be formed of two or more kinds of resins. When the resin film is formed of two or more kinds of resins, the resin film is preferably a multilayer body. Furthermore, the uppermost layer of the multilayer body (the layer in contact with the latex ink-receiving layer) is preferably a polyester resin, and more preferably polyethylene terephthalate, from the viewpoint of improvement in adhesion with the latex ink-receiving layer.

The resin film may be unstretched, or may be stretched in a uniaxial direction such as a longitudinal direction or a lateral direction, or a biaxial direction.

In addition, the resin film may contain an additive for a base material such as a surface conditioner, a plasticizer, an ultraviolet absorber, a light stabilizer, and a colorant together with these resins.

A content of the additive for the base material is preferably 10 mass % or less, more preferably 5 mass % or less, and still more preferably 3 mass % or less, based on the total amount of the base material (Y).

A thickness of the base material is not particularly limited and is preferably from 15 μm to 300 μm, and more preferably from 30 μm to 200 μm.

Pressure Sensitive Adhesive Layer (Z)

The film for latex ink according to one aspect of the present invention may have a pressure sensitive adhesive layer (Z).

When the film for latex ink according to one aspect of the present invention has the pressure sensitive adhesive layer (Z), the film for latex ink can be suitably used as a pressure sensitive adhesion film.

The pressure sensitive adhesive constituting the pressure sensitive adhesive layer is not particularly limited, and examples thereof include an acrylic pressure sensitive adhesive, a urethane pressure sensitive adhesive, and a silicone pressure sensitive adhesive.

A thickness of the pressure sensitive adhesive layer (Z) is not particularly limited, and is preferably 5 μm to 100 μm, more preferably 10 μm to 70 μm, and still more preferably 15 μm to 50 μm from the viewpoint of improving the handleability when the film for latex ink is used as a pressure sensitive adhesion film.

Release Liner

The film for latex ink of one aspect of the present invention may include a release liner together with the pressure sensitive adhesive layer (Z).

The pressure sensitive adhesion surface of the pressure sensitive adhesive layer (Z) included in the film for latex ink according to one aspect of the present invention is covered with a release liner, and thus the pressure sensitive adhesion surface of the pressure sensitive adhesive layer (Z) can be suitably protected during transportation and storage of the film for latex ink.

The release liner is not particularly limited, and a release liner commonly used in the field of the pressure sensitive adhesion film can be used as appropriate. Examples of the release liner include a laminate in which a release layer is provided on the surface of a film or a paper.

Examples of the film include a polyester resin such as polyethylene terephthalate, a polyolefin resin such as a polyethylene resin and a polypropylene resin.

Examples of the paper include paper such as wood-free paper, kraft paper, and glassine paper.

Examples of the constituent material of the release layer include silicone, a long-chain alkyl-based resin, or a fluorine-based resin.

A thickness of the release liner is not particularly limited, and is preferably 10 μm to 150 μm, more preferably 20 μm to 130 μm, and still more preferably 30 μm to 50 μm.

Method for Producing Film for Latex Ink

The method for producing the film for latex ink according to one aspect of the present invention is not particularly limited, and is selected as appropriate depending on the configuration of the film for latex ink.

Method for Forming Latex Ink-Receiving Layer (X)

A method for forming the latex ink-receiving layer (X) preferably includes applying the resin composition (x1) to one surface (Ya) of the base material (Y) to form a coating, drying the coating, and then cross-linking the coating to form the latex ink-receiving layer (X).

Note that, in order to improve the workability of application to the base material (Y), the resin composition (x1) is preferably diluted with a diluent solvent to form a solution.

Examples of the diluent solvent include organic solvents such as methyl ethyl ketone, acetone, ethyl acetate, tetrahydrofuran, dioxane, cyclohexane, n-hexane, toluene, xylene, n-propanol, and isopropanol.

A solid content concentration of the solution of the resin composition (x1) is preferably 10 mass % to 50 mass %.

Examples of the method for applying the solution of the resin composition (x1) include a Meyer bar coating method, a gravure coating method, a roll coating method, a knife coating method, and a die coating method.

A heating condition for drying the coating film is, for example, a drying temperature of 60° C. to 120° C. and a drying time of 30 seconds to 3 minutes.

The heating condition for drying the coating film is not particularly limited, and for example, a drying temperature of 60° C. to 120° C. and a drying time of 30 seconds to 3 minutes.

A cross-linking condition is not particularly limited, and for example, the coating may be left stand in a normal environment (for example, 23° C. and a relative humidity of 50) for 1 day or longer and 14 days or shorter for cross-linking, or may be left stand in an environment of 40° C. to 60° C. for 1 day to 3 days for cross-linking. Furthermore, a drying step and a cross-linking step may be performed collectively.

Method for Forming Pressure Sensitive Adhesive Layer (Z)

When the film for latex ink of one aspect of the present invention includes the pressure sensitive adhesive layer (Z), the pressure sensitive adhesive layer (Z) is formed on the other surface (Yb) of the base material (Y), where the latex ink-receiving layer (X) is not formed.

For example, a composition (a composition for forming a pressure sensitive adhesive layer) for forming the pressure sensitive adhesive layer (Z) is applied on the other surface (Yb) of the base material (Y) and thus the pressure sensitive adhesive layer (Z) is formed. Alternatively, the composition for forming a pressure sensitive adhesive layer may be applied to the release surface of the release liner to form the pressure sensitive adhesive layer (Z), and the pressure sensitive adhesive layer (Z) may be bonded (transferred) to the other surface (Yb) of the base material (Y).

The method for applying the composition for forming a pressure sensitive adhesive layer is the same as that described above as the resin composition (x1).

Application and the Like for Film for Latex Ink

The film for latex ink according to one aspect of the present invention is preferably used for printing using latex ink.

Therefore, according to the present invention, a method for using a film for latex ink is provided, to form a printed portion on the latex ink-receiving layer of the film for latex ink using latex ink.

Also, according to the present invention, a method for producing a printed article is provided, the method including forming a printed portion, using latex ink, on the latex ink-receiving layer of the film for latex ink.

Also, according to the present invention, a printed article is provided, the method including a printed portion printed with latex ink on the latex ink-receiving layer of the film for latex ink.

Hereinafter, the latex ink for forming a printed portion on the latex ink-receiving layer of the film for latex ink according to one aspect of the present invention will be described, and then a method for forming a printed portion on the latex ink-receiving layer of the film for latex ink according to one aspect of the present invention will be described.

Latex Ink

The latex ink contains a liquid dispersion medium and a dispersoid made of a material containing at least a resin, the material being dispersed (emulsified and/or suspended) in the dispersion medium.

The latex ink has low environmental load. Furthermore, the latex ink can advantageously express a dark color by a thin layer. Latex particles constituting the latex ink contain a binder (resin), which is generally advantageous in improving adhesion of a pigment colorant to a recording medium. Further, with the latex ink, a ink jet method can be employed. Therefore, there is an advantage that printing can be processed on demand.

The latex ink is preferably a water-based ink. The water-based ink suppresses generation of volatile organic substances caused by an organic solvent, and the water-based ink has higher safety and less load on the environment.

Resin

The resin contained in the latex ink is not particularly limited, and examples thereof include a vinyl resin, an acrylic resin, a styrene resin, an alkyd resin, a polyester resin, a polyurethane resin, a silicone resin, a fluorine resin, an epoxy resin, a phenoxy resin, a polyolefin resin, and modified resins thereof (for example, modified resins modified to be water-soluble), and one or more selected therefrom can be used in combination. Among them, an acrylic resin, a styrene resin, a water-soluble polyurethane resin, a water-soluble polyester resin, and a water-soluble acrylic resin are preferable, and an acrylic resin is more preferable.

The latex ink used in the film for latex ink according to one aspect of the present invention preferably contains an acrylic resin from the viewpoint of further improving the adhesion between the latex ink-receiving layer (X) and the printed portion.

The content of the resin in the latex ink is preferably from 1 mass % to 20 mass %, and more preferably from 2 mass % to 10 mass %, based on the total amount of the latex ink.

(Dispersion Medium)

The latex ink contains water as a dispersion medium.

A content ratio of the dispersion medium (water) in the latex ink is preferably from 50 mass % to 98 mass %, more preferably from 60 mass % to 97 mass %, and still more preferably from 70 mass % to 96 mass %, based on the total amount of the latex ink.

Colorant

The latex ink usually contains a colorant.

As the colorant, various dyes, various pigments, and the like can be used.

A content of the colorant in the latex ink is preferably from 0.1 mass % to 20 mass %, and more preferably from 0.2 mass % to 10 mass %, based on the total amount of the latex ink.

Another Component

The latex ink may contain components besides those described above (other components).

Examples of such a component include a dispersant, an antifungal agent, a rust inhibitor, a pH adjuster, a surfactant, a plasticizer, an ultraviolet absorber, and a light stabilizer.

Formation of Printed Portion

The printed portion printed with the latex ink is formed by applying the latex ink on the latex ink-receiving layer (X) of the film for latex ink. The latex ink preferably contains an acrylic resin from the viewpoint of further improving the adhesion between the latex ink-receiving layer (X) and the printed portion.

The method for applying the latex ink is not particularly limited, and various printing methods can be used, but an ink jet method is preferable. Examples of the ink jet method include a piezo method and a thermal jet method.

When the latex ink is applied, the film for latex ink may be heated. A heating temperature is not particularly limited, and is preferably 40° C. to 90° C.

According to the above method, a printed article having a printed portion printed with the latex ink on the latex ink-receiving layer (X) of the film for latex ink is obtained. The latex ink preferably contains an acrylic resin from the viewpoint of further improving the adhesion between the latex ink-receiving layer (X) and the printed portion.

EXAMPLES

The present invention will be specifically described with reference to examples below, but the present invention is not limited to the following examples.

Method of Measuring Various Physical Properties

Methods for measuring various physical property values in this example are as described below.

(1) Hydroxyl Value

The hydroxyl value of the acrylic resin (A) having a cross-linkable functional group was measured in accordance with JIS K 0070:1992.

(2) Acid Value

The acid value of the acrylic resin (A) having a cross-linkable functional group was measured in accordance with JIS K 0070:1992.

(3) Glass Transition Temperature (Tg)

The glass transition temperature (Tg) of the acrylic resin (A) having a cross-linkable functional group was measured using a differential scanning calorimeter (Product name "DSC Q2000" available from TA Instruments Japan Inc.) at a heating rate of 20° C./min in accordance with JIS K 7121:1987.

(4) Thickness of Each Layer

The thickness of each layer was measured using a constant pressure thickness meter (manufactured by Model number: "PG-02J", standard specifications: in accordance with JIS K6783:1994, JIS Z1702:1994, and JIS Z1709:1995).

Examples 1 to 16 and Comparative Examples 1 and 2

Films for latex ink of Examples 1 to 16 and Comparative Example 1 and 2 were produced by the following procedures.

Preparation of Resin Composition

In the preparation of the resin composition, the following resins and cross-linking agents were used.

Resin

Acrylic Resin (A) Having Cross-Linkable Functional Group

- Acrylic resin (A)-1: Hydroxyl value 11.0 mgKOH/g, acid value 3.9 mgKOH/g, glass transition temperature (Tg) 90° C.
- Acrylic resin (A)-2: Hydroxyl value 5.4 mgKOH/g, acid value 3.9 mgKOH/g, glass transition temperature (Tg) 90° C.
- Acrylic resin (A)-3: Hydroxyl value 21.4 mgKOH/g, acid value 3.9 mgKOH/g, glass transition temperature (Tg) 90° C.
- Acrylic resin (A)-4: Hydroxyl value 11.0 mgKOH/g, acid value 1.9 mgKOH/g, glass transition temperature (Tg) 90° C.
- Acrylic resin (A)-5: Hydroxyl value 11.0 mgKOH/g, acid value 3.9 mgKOH/g, glass transition temperature (Tg) 80° C.
- Acrylic resin (A)-6: Hydroxyl value 11.0 mgKOH/g, acid value 3.9 mgKOH/g, glass transition temperature (Tg) 70° C.
- Acrylic resin (A)-7: Hydroxyl value 5.4 mgKOH/g, acid value 3.9 mgKOH/g, glass transition temperature (Tg) 70° C.
- Acrylic resin (A)-8: Hydroxyl value 11.0 mgKOH/g, acid value 1.9 mgKOH/g, glass transition temperature (Tg) 70° C.
- Acrylic resin (A)-9: Hydroxyl value 11.0 mgKOH/g, acid value 7.7 mgKOH/g, glass transition temperature (Tg) 90° C.

Additional Resin

Urethane-Modified Polyester Resin

Cross-Linking Agent

Cross-Linking Agent (B)

- A partially modified product of isocyanurate compound (corresponding to a cross-linking agent including the isocyanurate compound (B1) and the modified product (B2) of the isocyanurate compound)

Cross-Linking Agent (B')

- Isocyanurate compound (Unmodified product, corresponding to isocyanurate compound (B1))

Other Additives

Tin Catalyst

Each of the resin compositions was prepared according to the formulation shown in Table 1 (the blending amount was in terms of active components) (active component concentration: 10 mass %, diluent solvent: ethyl acetate), and the resin composition was applied onto one surface of a polyethylene terephthalate (PET) film (thickness: 50 μm) using a Meyer bar so that the coating thickness after drying was 1 μm.

Next, the resin composition was heated at 90° C. for 1 minute using a hot air drying apparatus to remove the solvent contained in the resin composition applied to the base material, and the resin composition was left standing in an environment of 23° C. and a relative humidity of 50% for 7 days to be cross-linked. Thus, a latex ink-receiving layer (X) having a thickness of 1 μm was formed and a film for latex ink was produced.

Evaluation 1

(1) Evaluation of Adhesion of Base Material (Y) to Latex Ink-Receiving Layer (X)

For each of Examples 1 to 16 and Comparative Examples 1 and 2, the film for latex ink was allowed to stand in an environment of 23° C. and a relative humidity of 50% for 24 hours, and a test sample was prepared. Cellotape (trade name, available from Nichiban Co., Ltd.) having a size of 10 cm×24 mm was attached to a surface of the test sample on which the latex ink-receiving layer (X) was formed. The tape was peeled off and the latex ink-receiving layer (X) was inspected for residual state. The adhesion was evaluated according to the following criteria.

A: The latex ink-receiving layer (X) was sufficiently remained, and adhesion was excellent.

F: The residual state of the latex ink-receiving layer (X) was poor, and adhesion was poor.

(2) Evaluation of Adhesion of Printed Portion Printed with Latex Ink to Latex Ink-Receiving Layer (X)

For each of the film for latex inks of Examples 1 to 16 and Comparative Examples 1 and 2, a predetermined test pattern was printed on the surface of the latex ink-receiving layer (X) by an ink jet method with an ink jet printer (HP Latex 82000 available from Hewlett Packard Japan, Inc.) using latex ink (HP 882 available from Hewlett Packard Japan, Inc.), a printed portion (printed layer) was prepared.

Then, for each of Examples 1 to 16 and Comparative Examples 1 and 2, the film for latex ink having the printed portion of the predetermined test pattern was formed thereon was allowed to stand in an environment of 23° C. and a relative humidity of 50% for 30 minutes, 1 hour, 1 day, and 5 days. Thus, the test samples were prepared. Cellotape (trade name, available from Nichiban Co., Ltd.) of 10 cm×24 mm was attached to the surface of the test sample on which the printed portion was formed. The residual ratio (area of the survived printed portion/total area) of the printed portion that survived after tape peeling was determined. The adhesion was evaluated according to the following criteria.

1: Residual ratio is less than 20%

2: Residual ratio is 20% or greater and less than 40%

3: Residual ratio is 40% or greater and less than 60%

4: Residual ratio is 60% or greater and less than 90%

5: Residual ratio is 90% or greater

The evaluation results are shown in Table 1.

TABLE 1

| | | | | | Examples | | | | | | | | |
|---|---|---|---|---|---|---|---|---|---|---|---|---|---|
| | | | | Unit | 1 | 2 | 3 | 4 | 5 | 6 | 7 | 8 | 9 |
| Composition or the like of latex ink-receiving layer (X) | Resin | Acrylic resin (A) | Acrylic resin (A)-1 | Mass % | 93.90 | 91.66 | — | — | — | — | — | — | — |
| | | | Acrylic resin (A)-2 | Mass % | — | — | 95.42 | — | — | — | — | — | — |
| | | | Acrylic resin (A)-3 | Mass % | — | — | — | 91.66 | 89.05 | — | — | — | — |
| | | | Acrylic resin (A)-4 | Mass % | — | — | — | — | — | 95.33 | 94.61 | 91.66 | — |
| | | | Acrylic resin (A)-5 | Mass % | — | — | — | — | — | — | — | — | 91.66 |
| | | | Acrylic resin (A)-6 | Mass % | — | — | — | — | — | — | — | — | — |
| | | | Acrylic resin (A)-7 | Mass % | — | — | — | — | — | — | — | — | — |
| | | | Acrylic resin (A)-8 | Mass % | — | — | — | — | — | — | — | — | — |
| | | | Acrylic resin (A)-9 | Mass % | — | — | — | — | — | — | — | — | — |
| | | Urethane-modified polyester resin | | Mass % | — | — | — | — | — | — | — | — | — |

TABLE 1-continued

| | | | | | | | | | | | | | |
|---|---|---|---|---|---|---|---|---|---|---|---|---|---|
| | Cross-linking agent | Cross-linking agent (B) | | Mass % | 5.63 | 7.88 | 4.10 | 7.88 | 10.51 | 4.19 | 4.92 | 7.88 | 7.88 |
| | | Cross-linking agent (B') | | Mass % | — | — | — | — | — | — | — | — | — |
| | Other additives | | | Mass % | 0.47 | 0.46 | 0.48 | 0.46 | 0.44 | 0.48 | 0.47 | 0.46 | 0.46 |
| | Total | | | Mass % | 100.00 | 100.00 | 100.00 | 100.00 | 100.00 | 100.00 | 100.00 | 100.00 | 100.00 |
| | Physical properties of acrylic resin (A) | | Hydroxyl value | mgKOH/g | 11.0 | 11.0 | 5.4 | 21.4 | 21.4 | 11.0 | 11.0 | 11.0 | 11.0 |
| | | | Acid value | mgKOH/g | 3.9 | 3.9 | 3.9 | 3.9 | 3.9 | 1.9 | 1.9 | 1.9 | 3.9 |
| | | | Tg | ° C. | 90 | 90 | 90 | 90 | 90 | 90 | 90 | 90 | 80 |
| | Blending amount of cross-linking agent with respect to 100 parts by mass of resin | | | part by mass | 6.0 | 8.6 | 4.2 | 8.4 | 11.8 | 4.4 | 5.2 | 8.6 | 8.6 |
| Evaluation results | Base material adhesion | | | — | A | A | A | A | A | A | A | A | A |
| | Ink adhesion | | After 30 minutes | — | 1 | 4 | 5 | 5 | 5 | 3 | 4 | 5 | 5 |
| | | | After 1 hour | — | 4 | 4 | 5 | 5 | 5 | 5 | 5 | 5 | 5 |
| | | | After 1 day | — | 5 | 5 | 5 | 5 | 5 | 5 | 5 | 5 | 5 |
| | | | After 5 days | — | 4 | 5 | 3 | 5 | 5 | 5 | 5 | 5 | 5 |
| | Blocking | | Noise during peeling | — | 4 | 4 | 4 | 4 | 4 | 4 | 4 | 4 | 4 |
| | | | Sticking | — | 4 | 4 | 4 | 4 | 4 | 4 | 4 | 4 | 4 |

| | | | | | Examples | | | | | | | Comparative Examples | |
|---|---|---|---|---|---|---|---|---|---|---|---|---|---|
| | | | | Unit | 10 | 11 | 12 | 13 | 14 | 15 | 16 | 1 | 2 |
| Composition or the like of latex ink-receiving layer (X) | Resin | Acrylic resin (A) | Acrylic resin (A)-1 | Mass % | — | — | — | — | — | — | — | 92.34 | — |
| | | | Acrylic resin (A)-2 | Mass % | — | — | — | — | — | — | — | — | — |
| | | | Acrylic resin (A)-3 | Mass % | — | — | — | — | — | — | — | — | — |
| | | | Acrylic resin (A)-4 | Mass % | — | — | — | — | — | — | — | — | — |
| | | | Acrylic resin (A)-5 | Mass % | — | — | — | — | — | — | — | — | — |
| | | | Acrylic resin (A)-6 | Mass % | 93.37 | 91.66 | — | — | — | — | — | — | — |
| | | | Acrylic resin (A)-7 | Mass % | — | — | 95.42 | — | — | — | — | — | — |
| | | | Acrylic resin (A)-8 | Mass % | — | — | — | 94.61 | 91.66 | — | — | — | — |
| | | | Acrylic resin (A)-9 | Mass % | — | — | — | — | — | 91.66 | 90.17 | — | — |
| | | Urethane-modified polyester resin | | Mass % | — | — | — | — | — | — | — | — | 97.00 |
| | Cross-linking agent | Cross-linking agent (B) | | Mass % | 6.16 | 7.88 | 4.10 | 4.92 | 7.88 | 7.88 | 9.38 | — | 2.52 |
| | | Cross-linking agent (B') | | Mass % | — | — | — | — | — | — | — | 7.20 | — |
| | Other additives | | | Mass % | 0.47 | 0.46 | 0.48 | 0.47 | 0.46 | 0.46 | 0.45 | 0.46 | 0.48 |
| | Total | | | Mass % | 100.00 | 100.00 | 100.00 | 100.00 | 100.00 | 100.00 | 100.00 | 100.00 | 100.00 |
| | Physical properties of acrylic resin (A) | | Hydroxyl value | mgKOH/g | 11.0 | 11.0 | 5.4 | 11.0 | 11.0 | 11.0 | 11.0 | 11.0 | 3 |
| | | | Acid value | mgKOH/g | 3.9 | 3.9 | 3.9 | 1.9 | 1.9 | 7.7 | 7.7 | 3.9 | <1 |
| | | | Tg | ° C. | 70 | 70 | 70 | 70 | 70 | 90 | 90 | 90 | 83 |

TABLE 1-continued

| | | | | | | | | | | | | |
|---|---|---|---|---|---|---|---|---|---|---|---|---|
| | Blending amount of cross-linking agent with respect to 100 parts by mass of resin | | part by mass | 6.6 | 8.6 | 4.2 | 5.2 | 8.6 | 8.6 | 10.4 | 8.6 | 1.3 |
| Evaluation results | Base material adhesion | | — | A | A | A | A | A | A | A | F | A |
| | Ink adhesion | After 30 minutes | — | 1 | 5 | 4 | 5 | 5 | 5 | 5 | — | 1 |
| | | After 1 hour | — | 4 | 5 | 5 | 5 | 5 | 5 | 4 | — | 1 |
| | | After 1 day | — | 5 | 5 | 5 | 5 | 5 | 5 | 5 | — | 1 |
| | | After 5 days | — | 4 | 5 | 5 | 5 | 5 | 5 | 5 | — | 1 |
| | Blocking | Noise during peeling | — | 4 | 4 | 4 | 4 | 4 | 4 | 4 | — | — |
| | | Sticking | — | 4 | 4 | 4 | 4 | 4 | 4 | 4 | — | — |

Table 1 shows the following.

It is found that in the film for latex ink for each of Examples 1 to 16, the latex ink-receiving layer (X) has excellent adhesion to both the printed portion printed with the latex ink and the base material.

On the other hand, it is found that when the unmodified isocyanate compound (B1) is used as the cross-linking agent as in Comparative Example 1, the latex ink-receiving layer (X) is poor in adhesion to the base material.

In addition, it is found that when the urethane-modified polyethylene resin is used as in Comparative Example 2, the latex ink-receiving layer (X) is poor in adhesion between the latex ink-receiving layer (X) and the printed portion although the adhesion between the latex ink-receiving layer (X) and the base material is secured.

Evaluation 2

A blocking test was performed on the film for latex ink for each of Examples 1 to 16 which excelled in adhesion to both of the printed portion printed with the latex ink and the base material.

(1) Blocking Test

For each of Examples 1 to 16, the film for latex ink was cut into a size of 5 cm×10 cm, and 10 sheets of these cut films were stacked to prepare a laminate. The laminate was sandwiched by glass sheets each having a thickness of 3 mm, and was left to stand for 7 days in an environment at 40° C. and 80% relative humidity, where 2 kg of weight was applied on the glass sheets. Then, the laminate was removed from glass sheets, and allowed to stand in an environment of 23° C. and a relative humidity of 50% for 24 hours. Thereafter, the film for latex ink was peeled one by one, and a noise during peeling and sticking were evaluated.

The noise during peeling was evaluated in five stages of 1, 2, 3, 4, and 5 in order of noise level. When the noise during peeling was inaudible, it was rated as 5. The smaller the noise (the larger the rating), the better the blocking resistance performance.

Meanwhile, the sticking was evaluated in five stages of 1, 2, 3, 4, and 5 in order of strong adhesion. When no sticking was observed, the evaluation value was 5. The smaller the sticking (the larger the rating), the better the blocking resistance performance.

The results of the blocking test are shown in Table 1.

From the results of the blocking test shown in Table 1, it can be seen that the films for latex ink of Examples 1 to 16 have excellent blocking resistance performance.

REFERENCE SIGNS LIST

1 Film for latex ink
X Latex ink-receiving layer
Y Base material
Ya One surface of base material
Yb The other surface of base material
Z Pressure sensitive adhesive layer

The invention claimed is:

1. A film for latex ink comprising
a laminate structure in which a latex ink-receiving layer (X) and a base material (Y) are stacked,
wherein the latex ink-receiving layer (X) is formed of a resin composition (x1) comprising an acrylic resin (A) having a cross-linkable functional group and a cross-linking agent (B),
the cross-linking agent (B) comprises an isocyanurate compound (B1) and a modified product (B2) of the isocyanurate compound,
the isocyanurate compound (B1) is a trimer of 1,6-hexamethylene diisocyanate, and
the modified product (B2) of the isocyanurate compound is a trimer of 1,6-hexamethylene diisocyanate, and has one tertiary amino group or two or more tertiary amino groups.

2. The film for latex ink according to claim 1,
wherein the acrylic resin (A) having the cross-linkable functional group has a hydroxyl value of 5.0 mg KOH/g to 25.0 mg KOH/g.

3. The film for latex ink according to claim 1, wherein the acrylic resin (A) having the cross-linkable functional group has a glass transition temperature (Tg) of 100° C. or lower.

4. The film for latex ink according to claim 1, wherein a total content of the isocyanurate compound (B1) and the modified product (B2) of the isocyanurate compound is 4.0 parts by mass or greater with respect to 100 parts by mass of the acrylic resin (A) having the cross-linkable functional group.

5. The film for latex ink according to claim 1, wherein the base material (Y) comprises a polyester resin.

6. The film for latex ink according to claim 1, wherein the film is suitable for use in printing using latex ink comprising an acrylic resin.

7. A method for using a film for latex ink described in claim 1, comprising forming a printed portion on the latex ink-receiving layer of the film for latex ink using latex ink.

8. A method for producing a printed article, the method comprising forming a printed portion on a latex ink-receiving layer of the film for latex ink described in claim 1 using latex ink.

9. A printed article comprising a printed portion printed with latex ink on a latex ink-receiving layer of the film for latex ink described in claim 1.

* * * * *